Patented Feb. 20, 1940

2,191,260

UNITED STATES PATENT OFFICE 2,191,260

PROCESS OF PREPARING CHOLESTEROL

Jules D. Porsche and Fred J. Solms, Chicago, Ill., assignors to Armour and Company, Chicago, Ill., a corporation of Illinois No Drawing. Application May 3, 1938, Serial No. 205,867

6 Claims. (Cl. 260—397)

This invention relates to processes of preparing cholesterol, and it comprises processes wherein cholesterol-containing materials, such as brain tissue, spinal cord, and the like are reacted with alkaline earth saponifying agents, the saponification mixture extracted with an organic solvent for cholesterol, and cholesterol recovered from the extract.

Hitherto cholesterol has been recovered from animal tissue material by saponification of the material with alkali metal hydroxide solutions, such as caustic soda or potassium hydroxide. This method has not been entirely satisfactory because complex emulsions are formed. These emulsions are difficult to handle and recovery of cholesterol from such emulsified reaction mixtures is expensive. Cholesterol recovery in this method is never complete.

In still other ways the cholesterol-containing materials have been admixed with plaster of Paris for the purpose of taking up the moisture in the tissue and giving a hard substantially solid mixture which can be pulverized and extracted with a cholesterol solvent. Acetone is frequently used as the solvent but in this method cerebrosides contaminate the cholesterol. Nevertheless the plaster of Paris method gives practically quantitative yields of cholesterol but bulkiness of the mixture makes handling difficult and expensive.

We have set ourselves to the problem of discovering ways by which cholesterol can be obtained in quantitative yields from cholesterol-containing materials without the disadvantages of either the alkali saponification process or the plaster of Paris method.

We have discovered that when cholesterol-containing material is reacted with alkaline earth saponifying agents, namely the oxides or hydroxides of the alkaline earth metals, we obtain a saponification mixture from which the cholesterol can be extracted with any suitable cholesterol solvent. Because of the nature of our saponifying agent no emulsions are encountered and the alkaline earth oxide or hydroxide forms complex compounds with the galactose portions of the cerebrosides present which are insoluble in the cholesterol solvent. Consequently, the reaction mass which we extract with an organic cholesterol solvent contains substantially no materials, other than cholesterol, which are soluble in the solvent.

Although our process, in broad aspects, involves the substitution of alkaline earth metal oxides and hydroxides for alkali metal hydroxides our process greatly simplifies and cheapens the extraction of cholesterol from cholesterol-containing materials. This is because the reaction mixture prior to extraction is a solid material readily admixed with the extracting solvent. Thus our process has the advantages of the plaster of Paris process in that mixtures of solids are extracted with the solvent but has none of the disadvantages of the plaster of Paris method.

Any of the alkaline earth metal oxides or hydroxides can be used. The oxides and hydroxides of calcium are best because they are readily available and cheap. But our invention is broad enough to include use of the oxides and hydroxides of strontium, barium and magnesium.

For best results we find it advantageous to react the cholesterol-containing material with these oxides or hydroxides in the absence of any added water. Thus, for example, the cholesterol-containing tissue is minced and admixed with the saponifying agent in substantially dry condition. Thereafter the mixture is heated, as will be more fully hereinafter described, and the saponification mixture, still in a substantially dry condition is extracted with the cholesterol solvent. This dry-saponification method has many technical advantages but we do not wish to be limited to excluding added water for the saponification. We can, for example, prepare a slurry of slaked lime in water, admix the slurry with minced animal tissue and heat to induce saponification. After the reaction is complete the insoluble mass of calcium saponification products containing cholesterol can be separated from the aqueous portion of the mixture by any convenient method. For example, the mixture can be allowed to stand whereby the insoluble materials settle from which the water can be drawn off and the insoluble mass squeezed to remove any further amounts of water and then extracted with a cholesterol solvent.

But the addition of extraneous water is unnecessary because of the presence of moisture in the animal tissue itself and, consequently, we find it better to simply admix the minced tissue material with the saponifying agent in the absence of any additional water and, after the saponifying reaction is complete, extract the substantially dry mass with the cholesterol solvent.

There are many solvents which we can use. Among them are ether, alcohol, acetone, petroleum ether, and various chlorinated solvents, such as ethylene dichloride, chlorinated benzol, and the like. Ethyl acetate is also useful.

We shall now give examples of how our invention may be practised.

Twenty pounds of beef spinal cord are minced with two pounds of slaked lime. This alkaline saponifying agent is almost entirely calcium hydroxide, or hydrated calcium oxide. Instead of using slaked lime we can use unslaked lime. The resulting intimate mixture is then heated in an autoclave for about three hours, heat being used to facilitate the saponification reaction. The temperature during this step can vary over wide limits, but we generally use temperatures of about 100° C. to 125° C.

After saponification in the manner stated, we then allow the reaction mixture to cool to room temperature and vigorously agitate it with about eight to nine gallons of ethylene dichloride. The ethylene dichloride is a cholesterol solvent and instead of it we can use any of the other common organic solvents used for this purpose and mentioned above. After allowing the mixture to stand for some time, about twelve hours, the ethylene dichloride extract is drawn off from the solid residue which can be filtered by suction to remove final traces of ethylene dichloride extract. In order to insure complete recovery of the cholesterol we advantageously reextract the saponification mixture with a further quantity of ethylene dichloride, about twelve gallons.

We then combine the ethylene dichloride extracts and refrigerate the mixture at about 37° F. over-night for the purpose of precipitating materials other than cholesterol which may have been extracted along with the cholesterol. The next day the ethylene dichloride extract is filtered and the filtrate evaporated. Using the quantities stated above, we obtain about a pound of crude cholesterol which can be recrystallized from alcohol in the known manner.

Working in the manner stated we entirely avoid any aqueous emulsions. Yields of cholesterol are higher than hitherto obtained, the product as recrystallized from alcohol is of a higher degree of purity, and the method is much cheaper.

When using brain tissue and other sources of cholesterol we proceed in precisely the same manner always using enough lime to saponify all of the lipoids present and thus liberate the cholesterol in a form from which it can be extracted from the saponification mixtures.

In another example, 500 parts by weight of spinal cord are hashed and mixed with 50 parts by weight of strontium hydroxide. The mixture is heated for about three hours in an autoclave at about fifteen pounds steam pressure. After the reaction is complete the mass is freed of any excess water by pressing in a cloth bag or by decantation. The granular mass is then extracted with about 2,000 parts of ethyl acetate reextracted with about the same amount of a further quantity of ethyl acetate and the extracts combined. The combined extracts are next decolorized with a suitable decolorizing material, such as an activated carbon or clay and finally filtered. On evaporating the ethyl acetate solution we obtain a yield of about 27 parts by weight of cholesterol.

In exactly the same manner we react the minced tissue with barium hydroxide and extract the saponification mixture with acetone. The acetone extract can be decolorized and cholesterol recovered therefrom by evaporation of the solvent.

In a further example we react 500 parts by weight of minced spinal cord with 25 parts by weight of magnesium oxide. The saponification mixture is then pressed to remove any water and extracted with ortho dichlorbenzene. From the extract we recover cholesterol by evaporation and recrystallization from alcohol.

The chlorinated hydrocarbons are the best solvents to use for technical purposes but other solvents mentioned above are, of course, suitable.

Having thus described our invention, what we claim is:

1. The method of obtaining cholesterol from animal tissue containing the same which comprises reacting the animal tissue with an alkaline saponifying agent chosen from the group consisting of alkaline earth metal oxides and hydroxides, and extracting the reaction mixture with an organic solvent for cholesterol.

2. The process as in claim 1 wherein the organic solvent is a chlorinated hydrocarbon solvent for cholesterol.

3. The process as in claim 1 wherein the alkaline earth oxide or hydroxide is an oxide or hydroxide of calcium.

4. The process of obtaining cholesterol from animal tissue containing the same which comprises reacting the animal tissue with a substantially dry alkaline earth metal saponifying agent chosen from the group consisting of alkaline earth metal oxides and hydroxides, and extracting the reaction mixture with an organic solvent for cholesterol.

5. The process as in claim 4 wherein the cholesterol solvent is a chlorinated hydrocarbon solvent for cholesterol.

6. The process as in claim 4 wherein the alkaline earth oxide or hydroxide is an oxide or hydroxide of calcium.

JULES D. PORSCHE.
FRED J. SOLMS.